Nov. 3, 1936.  F. R. LONG  2,059,531
COMBINED PIPE UNION AND CHECK VALVE
Filed Sept. 18, 1935

Inventor
*Fred R. Long,*

Patented Nov. 3, 1936

2,059,531

UNITED STATES PATENT OFFICE 2,059,531

COMBINED PIPE UNION AND CHECK VALVE

Fred R. Long, Catawissa, Pa.

Application September 18, 1935, Serial No. 41,145

7 Claims. (Cl. 251—123)

This invention relates to valves for pipe lines and more particularly to a novel combination pipe union and check valve having novel features of construction which make it leakproof under high pressures and also capable of ready insertion in the line without the use of an extra union or nipples or other fittings.

Check valves in general use, especially those of the swinging valve type ordinarily require separate unions and often nipples to connect them in the line. In other words while check valves of this type are usually made with opposite internally threaded end portions for receiving the threaded pipe, in many, if not all instances, it is necessary also to use a pipe union to install the valves in the line so that the check valve casing will be properly disposed in order to make the valve itself move to a normally closed position. Where it is necessary to use both a check valve and a union, or a check valve and a special nipple to place the check valve in the line, it is frequently necessary to cut pipe back in order to take care of the length or space of the additional fittings required. Obviously, this is undesirable not only from the standpoint of extra equipment but also from the standpoint of time and labor involved.

Moreover, check valves of the swinging type ordinarily require that the casing be bored or drilled to receive the shaft or pin on which the swinging valve is mounted and to also provide for an abutment which receives the impact of the swinging valve as it is forced open under high pressures. Also, it is customary to provide a check valve with an opening for assembling valve and for inspection purposes. This opening is closed by a cap. All of these openings, namely those for the valve shaft, abutment member and cap, provide sources of potential leakage under high pressure, and even though made tight when originally manufactured and installed, obviously become loose or worn from continued use, thereby making the liability to leakage a constant menace.

Accordingly, the present invention has primarily in view a combined union and check valve which may be handled as a unit and installed as such in any pipe line within the length occupied by the ordinary check valve, thereby not only economizing in space but also eliminating the necessity of cutting the pipe in any given installation to receive repair fittings. Thus, the present invention not only requires a minimum amount of space in the original pipe line but also eliminates all expense of labor necessary to the additional time and labor involved in making repairs.

Another object of the invention is to provide a combined pipe unit and check valve which has no openings other than those communicating directly with the pipe ends and which has no drilled or machined openings of any kind whatever, thereby making leakage an impossibility at any point within the valve casing itself. In that connection, it is proposed to install the swinging valve on a bracket mounted entirely within the valve casing, the said bracket being secured to the casing by fastenings which are accessible only through the interior of the union but are so placed that they may be reached and manipulated by a simple tool such as a screw driver from one end of the union when it is disconnected from the pipe. Thus, should it become necessary to remove the valve for any reason, that can be readily accomplished by simply removing the fastenings which secure the bracket to the interior of the casing, and, when the valve is removed, absolutely no openings are left in the casing so that in event it is necessary to re-establish the line by placing the union back in service, no leakage will result due to the removal of the valve support or bracket and the pipe line will function normally with the valve casing functioning as a pipe union.

A further object of the invention is to provide a demountable valve which enables the union and valve to be made and stocked separately and which also makes the valve easy to center inasmuch as the two fastenings provided for securing the bracket to the interior of the casing are so located and arranged that the mere act of placing the valve bracket in position in the valve chamber automatically centers the valve. Moreover, the valve bracket or support is so designed that the bracket itself will act as an impact or shock absorber when the valve is swung open by the force of pressure in the line. Check valves sometimes open and close frequently and often chatter under varying pressures and it is, therefore, necessary to insure that the batter of this continued impact does not in any way injure the valve casing to either crack or rupture it, or wear a hole therein. This contingency is adequately provided for in the present case by the valve supporting bracket being made of resilient or spring material which not only absorbs impact but also acts as a wear piece or shim to protect the valve body itself.

A still further object of the invention is to provide a practical combined pipe union and check valve which is not only economical to make because it has a minimum number of parts but also has less pieces than the average valve and requires no packings. The latter features also contribute materially to facility in installation as will be readily apparent to those skilled in the art.

With the above and other objects in view, which will more readily appear as the nature of the invention is better understood, the same consists in the novel features of construction, combination and arrangement of parts hereinafter more fully described, illustrated in the accompanying drawing and defined in the appended claims.

A preferred and practical embodiment of the invention is shown in the accompanying drawing, in which:—

Similar reference characters designate corresponding parts throughout the several figures of the drawing.

Figure 2:
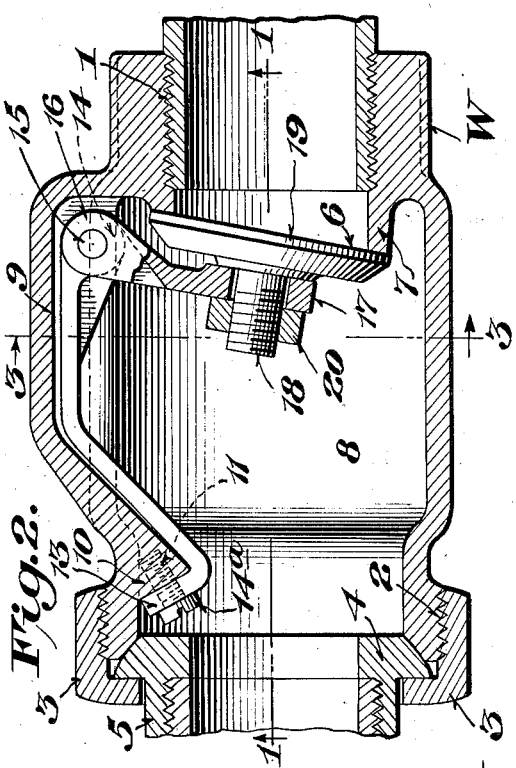
Figure 2 is a vertical cross-sectional view of the structure shown in Figure 1.
Figure 4:
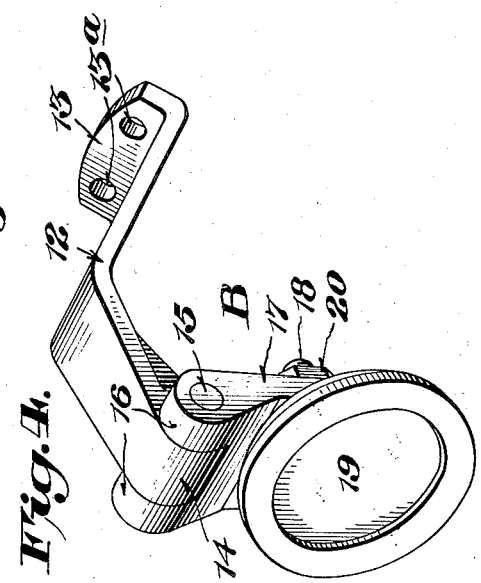
Figure 4 is a detail perspective view of the swinging valve and its mounting bracket.
Figure 1:
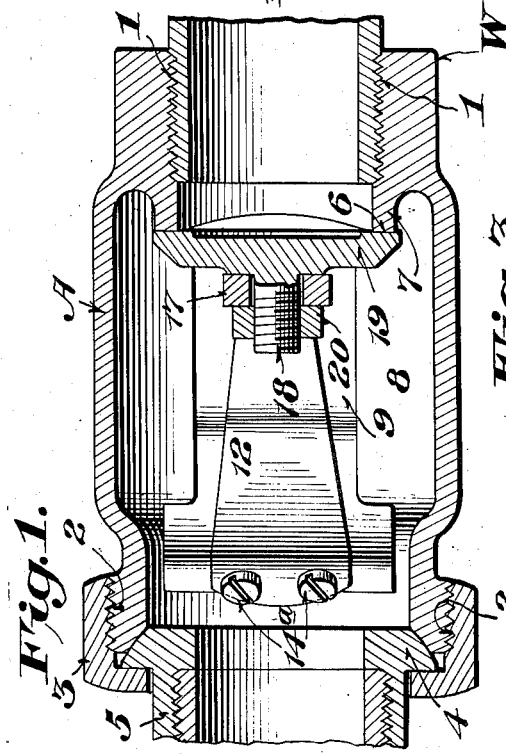
Figure 1 is a horizontal sectional view of the present invention taken on the line 1—1 of Figure 2.
Figure 3:
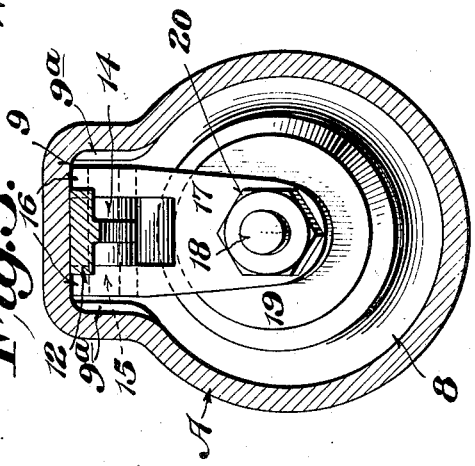
Figure 3 is a vertical cross-sectional view taken on the line 3—3 of Figure 2.

According to the embodiment of the invention shown in the drawing, it is proposed to provide a body or casing A which is internally threaded as indicated at 1 and externally threaded as shown at 2, thereby to receive the coupling ring or nut 3 which draws the flanged end 4 of the union section 5 to proper seating position on the bevelled end of the casing as clearly shown in Figures 1 and 2.

Adjacent the internally threaded end 1 the valve body is provided with a valve seat 6 which is preferably inclined due to forming the inwardly extending neck portion 7 of the casing at the proper angle. The body of the casing A is preferably formed with an enlarged valve chamber 8 and a portion of the body at the location of the chamber is extruded or formed outwardly as shown at 9 to provide a lateral housing which forms an internal cavity for receiving the valve supporting bracket to be presently described. If the valve is used in a horizontal position it will, of course, be understood that the valve bracket housing 9 is placed at the top of the installation. In the event that the device is used in a vertical pipe it will, of course, be understood that the same is placed in such a position that the valve seat 6 is located at the bottom of the installation so that the swinging valve will normally be seated or closed thereon.

Adjacent the externally threaded end of the valve body A, the same is interiorly formed with a boss 10 which is located substantially at the terminal portion of one end of the housing 9. This boss is provided with screw threaded sockets 11 having their axes inclined toward the open end of the casing which receives the union portion 5. These sockets are blind or closed at their lower ends so that there is no possibility of fluid leakage from the interior of the casing through these sockets.

The valve unit is designated generally as B and preferably includes the angular bracket 12 having the attaching portion 13 formed with openings 13ª for receiving screws or equivalent fastenings 14ª which fit into the threaded sockets 11 previously referred to. The body of the bracket 12 is made of spring steel and its general shape or configuration is such that it substantially conforms to the interior surfaces of the body at the point where the housing or hood 9 is formed. The end of the bracket 12 opposite the attaching portion or flange 13 is preferably enlarged in any suitable manner as indicated at 14 and provided with a hole thereby to receive the hinge pin which enters the openings provided in the spaced ears 16 on the valve carrier 17. The valve carrier 17 is provided with an opening for receiving the threaded shank 18 of the circular valve 19 which is intended to engage the valve seat 6. The said shank 18 is preferably fitted with a nut or equivalent fastening 20, thereby to not only secure the valve head to the valve carrier but to also provide sufficient play to enable the valve proper 19 to shift or rotate with reference to the valve seat 6 to avoid the focusing of excessive wear at any particular point on the valve or seat.

As will be apparent from Figures 1 and 2, when the bracket 12 of the valve unit B is placed in position, it will be securely held by the fastenings or screws 14. As the valve 19 swings closed, it will engage the seat 6. If it is thrown open or unseated by violent force in the line, the shank 18 of the valve will strike against the body of the bracket 12 so that the impact or shock of the opening will not be imposed directly on the valve casing. It may be also pointed out that when the bracket 12 is assembled in position within the valve casing, the valve pin 15 can not become disengaged because the ends of the pin are in substantially abutting relation with the sides 9ª of the interior of the cavity which prevent any longitudinal movement of the pin and also assist in centering the valve properly with reference to its seat.

Under all conditions of use it will be apparent from the foregoing description that the valve is absolutely leakproof due to the fact that the entire valve casing or housing is made in one piece and has no openings. It may be also pointed out that the internally threaded end of the union casing may be provided with wrench lugs W which facilitate the installation of the device in the line. Moreover, due to the fact that the valve is demountable with reference to the casing, it will be apparent that the valve and its casing may be readily subjected to their various finishing operations prior to final assembly, in a simple and expeditious manner.

Without further description it is thought that the features and advantages of the invention will be readily apparent to those skilled in the art, and it will of course be understood, that changes in the form, proportion and minor details of construction may be resorted to, without departing from the spirit of the invention and scope of the appended claims.

I claim:—

1. A combined pipe union and check valve device comprising an imperforate body providing a valve chamber in communication with pipe connections and having a laterally offset housing forming an interior cavity, and a valve seat and a boss formed with the body at the ends of the cavity, said boss having a fastening receiving socket; and a valve device removably mounted in the chamber, said valve device including a yielding bracket having one end secured to the boss by a fastening which enters the socket therein, and a swinging valve pivoted to the other end of the bracket to cooperate with the valve seat, said valve having a portion adapted to strike against the bracket at its extreme limit of swinging movement.

2. A combined pipe union and check valve device comprising an imperforate body providing a valve chamber in communication with pipe connections and having a laterally offset housing forming an interior cavity, and a valve seat and a boss formed with the body at the ends of the cavity, said boss having a fastening receiving socket, and a valve device removably mounted in the chamber, said valve device including a yielding bracket having one end secured to the boss by a fastening which enters the socket therein, a swinging valve, a pivot for connecting the valve to the bracket, said pivot lying between the spaced walls of the housing forming the cavity to center the valve with reference to its seat and to hold the pivot pin locked aaginst displacement.

3. A combined pipe union and check valve comprising a hollow body having a valve chamber adapted to communicate with pipe connections and also having an integral imperforate lateral housing portion forming a cavity opening into the valve chamber, and a valve seat and a boss formed within the body respectively at the opposite ends of the said cavity; and a valve device removably mounted in the chamber, said valve device including a bracket disposed within the cavity and having one end fitted to said boss, and a valve pivoted to the other end of the bracket and cooperating with said valve seat.

4. A combined pipe union and check valve comprising a body including a valve chamber and having a laterally offset housing forming an interior cavity opening into said chamber, and a valve seat formed in said chamber; and a demountable valve device including a bracket made of spring material fitting in said cavity, said bracket having one end detachably secured to the interior of the valve body and a valve pivoted to the other end, the intermediate portion of the bracket constituting a substantially yieldable abutment for the valve at the limit of its rearward movement to shield the body from impact.

5. A combined pipe union and check valve including a body formed with an interior valve chamber and internally threaded at one end and externally threaded at the other to receive a threaded coupling ring for clamping a self-centering union connection to the body, said body having an offset portion forming a lateral cavity opening into the valve chamber, and a valve device adapted to be inserted and removed from one end of the chamber, said valve device comprising a yielding bracket adapted to be positioned in said cavity and carrying a pivoted valve at one end to cooperate with the valve seat and at its other end having means for detachably engaging the interior of the chamber, said yielding bracket lying in the path of movement of the valve.

6. A combined pipe union and check valve comprising a hollow body open only at its opposite ends and having a valve chamber, internal threads at one open end of the body for permitting relatively fixed attachment thereof to a pipe line, external threads about the opposite open end of the body, a coupling ring on said external threads for detachably connecting a union section thereto, whereby the valve chamber may be rendered accessible without disturbing the aforesaid relatively fixed attachment of the internally threaded end on the pipe line, a valve seat formed in the body adjacent the internal threads, and a swinging valve unit adapted for insertion and removal from the valve chamber through the end of the body which is externally threaded, said valve unit including a bracket adapted to be disposed along one side of the valve chamber and pivotally carrying the valve at one end to locate it near the valve seat, and said bracket having its other end releasably connected to the interior of the body and at the end of the valve chamber accessible by disconnecting the coupling ring from said external threads.

7. A combined pipe union and check valve including a one piece hollow body open at opposite ends and having a valve seat at one open end, and a valve unit insertible and removable from the open end opposite the valve seat, said unit including a bracket normally extending along one interior wall of the body and pivotally supporting a valve at one end for cooperating with said valve seat, and means for releasably connecting the end of the bracket opposite the valve to the hollow body.

FRED R. LONG.